S. SEISCHAB.
KINEMATOGRAPHIC APPARATUS.
APPLICATION FILED AUG. 17, 1910.

986,318.

Patented Mar. 7, 1911.

2 SHEETS—SHEET 1.

Witnesses
E. Schallinger
F. Stapel

Inventor
Stephan Seischab
by P. Singer
Att'y

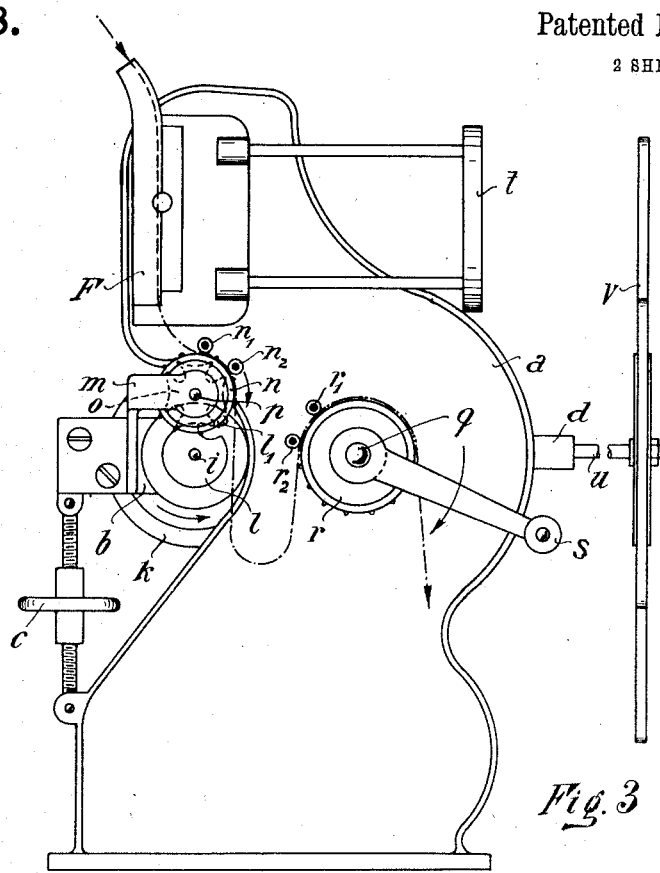
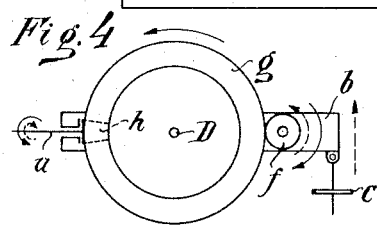
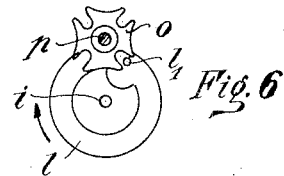
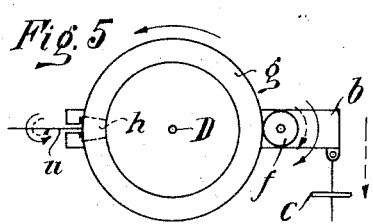
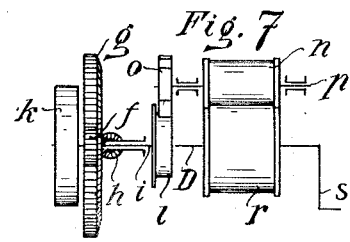

UNITED STATES PATENT OFFICE.

STEPHAN SEISCHAB, OF NUREMBERG, GERMANY.

KINEMATOGRAPHIC APPARATUS.

986,318.  Specification of Letters Patent.  Patented Mar. 7, 1911.

Application filed August 17, 1910. Serial No. 577,635.

*To all whom it may concern:*

Be it known that I, STEPHAN SEISCHAB, of Nuremberg, Bavaria, Germany, have invented an Improvement in or Relating to Kinematographic Apparatus, of which the following description, in connection with the accompanying drawing, is a specification.

This invention relates to a kinematographic apparatus having a device for setting or adjusting the film in the exposure window or aperture and a device positively connected to it for correspondingly adjusting the shutter.

The novel feature of the invention consists in the whole mechanism used both for advancing the picture band and for rotating the closing shutter, being supported on a double-armed beam which can be adjusted by means of an adjustment device and oscillate about the spindle of the crank- or driving wheel, in such manner that on the one arm is mounted the toothed wheel driving the film advancing roller by means of a Maltese cross and engaging with the crank- or driving wheel, while opposite, on the other arm, is arranged the shutter which is driven by a pinion also engaging with the driving wheel.

Owing to this arrangement, in addition to the exceedingly simple construction, the film can be very quickly and accurately moved up and down in the exposure window or aperture, by the adjustment of the double armed beam, while simultaneously with the adjustment of the picture, the shutter in front of the object glass is adjusted to the same extent in an exceedingly simple manner, so that the advance of the film and the closing of the shutter always coincide in the point of time, in spite of any movement of the picture film in the exposure window, so that very steady and sharp projections are obtained.

Apparatus are already known for projecting kinematograph pictures, in which the adjustment of the film picture in the exposure window is effected by means of a lever, but in those constructions the adjustability and the freedom of movement of the film band are very limited. It is also no longer new *per se* to move simultaneously the closing shutter by the adjustment of the film advancing device.

The device according to the present invention enables any desired adjustment of film to be made, even to the extent of the double width of a picture, in spite of only three toothed wheel engagements being required.

Figure 1:
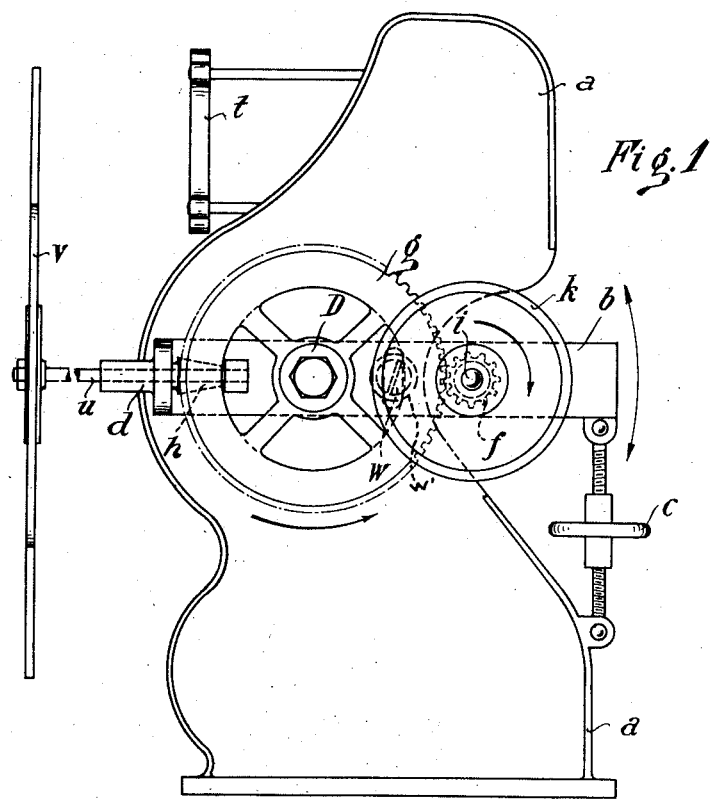
Figure 2:
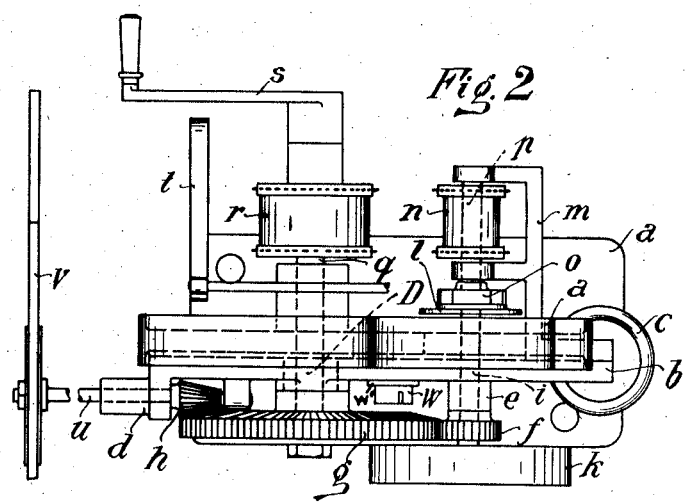

A construction according to this invention is illustrated by way of example in Figures 1–7 of the accompanying drawing, Figs. 1 and 2 being a front elevation and plan of the new device. Fig. 3 a back view, while Figs. 4–7 show the diagrams of the movements.

The standard $a$ carries the crank spindle $q$ on which is mounted, on one side, the crank $s$, and on the other side, the toothed wheel $g$ which is formed as a combined spur and bevel wheel. On the same spindle is mounted in a well known manner the discharge drum $r$ for the film. The spindle $q$ likewise carries a double-armed beam $b$ pivoted about the bearing point D. For moving the beam $b$ is preferably used a set-screw $c$. In order to obtain a steady movement of the beam, the latter is supported in a resilient manner by means of a screw $w$ screwed through a slot in the beam into the wall of the standard and carrying a resilient washer $w'$ resting against the beam. The beam is provided with two opposite bearings $d$ and $e$ in which are mounted the spindles $u$ and $i$ carrying driving pinions $h$ and $f$ respectively which both engage with the crank wheel $g$, namely the first as a bevel wheel, and the second as a spur wheel. At the free end of the spindle $i$ is mounted the disk or cam $l$ with a pin $l_1$ engaging in the well known manner with the Maltese cross $o$ (Fig. 6). The Maltese cross $o$ is mounted on a spindle $p$ supported by a fork $m$. The fork $m$ is connected to the beam $b$ and consequently participates in all the movements of the latter. In addition to the Maltese cross, the spindle $p$ also carries the film advancing roller $n$. Above the roller $n$ is arranged in a suitable manner the window or aperture F in the standard $a$. The film travels in the well known manner through the window F over the advance or driving roller $n$ against which it is pressed by means of guide rollers $n_1$ $n_2$.

As the film frequently does not take up such a position in the window opening that the latter is exactly filled by a picture on the film, the said picture must be shifted upward or downward during the working of the kinematograph. The shifting in question is effected in the present case by raising or lowering the double armed beam to a certain extent by adjusting the screw $c$. As for instance, the raising of the beam (Fig. 4) would result in the rolling of the pinion $f$ in the direction of the dotted arrow to a certain extent on the crank wheel, the advance of the Maltese cross would take place a certain time later than in the case of the normal position of the beam, as the pin $l_1$ comes a little later in engagement with the Maltese cross $o$ in accordance with the form or shape of the wheel $f$. As, however, the advance must always take place exactly at the same time as the closing of the shutter, $v$, the wheel $h$ is secured to the other end of the beam, and when the latter is oscillated, the wheel $h$ is advanced to exactly the same angular extent as the wheel $f$, as both the wheels engage at the opposite sides with the same wheel $g$. Consequently the closing of the shutter takes place, in spite of any shifting of the beam or of the film, always in exact synchronism with the advance of the film band.

Fig. 5 shows the position when the beam is shifted downward. The advance then takes place a little earlier than during the normal position of the beam, and the closing of the shutter will then also take place earlier to the same extent, so that the advance of the film and the closing of the shutter again coincide exactly in the point of time. On the spindle $i$ there is further mounted a fly wheel $k$ for the purpose of insuring a steady, uniform movement of the apparatus. The object glass ring $t$ is secured to the window F in any well known or preferred manner.

I claim

1. A kinematographic apparatus having a positive connection between the device for the adjustment of the film band in the exposure window, and that for the corresponding shifting of the shutter, in which the whole driving mechanism for the advance of the band and for the operation of the shutter, is mounted on a double-armed beam adjustable by means of a setting device and oscillating about the spindle of the crank or driving wheel, in such manner that on its one arm is mounted the toothed wheel or pinion driving the advance roller of the film by means of a Maltese cross and engaging with the crank or driving wheel, while opposite, on its other arm, is mounted the spindle of the shutter which is driven by means of a pinion engaging with the same crank or driving wheel.

2. A kinematograph apparatus comprising in combination, a driving shaft, a lever mounted on said shaft, film advancing and shutter means operatively connected with said shaft for adjustment and operation and mounted on said lever, and means for shifting said lever to synchronously adjust said film advancing and shutter means.

3. A kinematograph apparatus comprising in combination, a pivotally mounted lever, film advancing means and shutter means mounted on said lever, mechanism operatively connected with said advancing means and shutter means for operation and adjustment thereof, and means for shifting said lever to synchronously adjust said advancing and shutter means.

In testimony whereof I affix my signature in presence of two witnesses.

STEPHAN SEISCHAB.

Witnesses:
 HEINRICH FIETH,
 HEINRICH HAUSMANN.